United States Patent [19]

Squitieri

[11] Patent Number: 4,869,954

[45] Date of Patent: Sep. 26, 1989

[54] THERMALLY CONDUCTIVE MATERIALS

[75] Inventor: Vincent Squitieri, Billerica, Mass.

[73] Assignee: Chomerics, Inc., Woburn, Mass.

[21] Appl. No.: 95,295

[22] Filed: Sep. 10, 1987

[51] Int. Cl.$^4$ .................................................. B32B 5/16
[52] U.S. Cl. ............................... 428/283; 427/393.5; 428/240; 428/242; 428/246; 428/247; 428/255; 428/284; 428/285; 428/323; 428/329; 428/425.6; 428/425.8; 428/425.9
[58] Field of Search ............... 428/109, 110, 111, 113, 428/138, 247, 255, 256, 268, 273, 285, 286, 425.6, 425.8, 425.9, 251, 289, 290, 283, 284, 323, 329, 240, 242, 317.9, 246; 427/393.5

[56] References Cited

U.S. PATENT DOCUMENTS

| | | | |
|---|---|---|---|
| 3,391,242 | 7/1968 | Sudges | 174/15 |
| 3,523,056 | 8/1970 | Horning | 161/93 |
| 3,738,422 | 6/1973 | Economos et al. | 165/80 |
| 4,151,547 | 4/1979 | Rhoades | 357/81 |
| 4,299,715 | 11/1981 | Whitfield et al. | 252/74 |
| 4,466,483 | 8/1984 | Whitfield et al. | 165/185 |
| 4,471,837 | 9/1984 | Larson | 165/185 |
| 4,574,879 | 3/1986 | DeGree | 165/185 |

FOREIGN PATENT DOCUMENTS 2480489  10/1981  France .

OTHER PUBLICATIONS

IBM Technical Disclosure Bulletin, vol. 8, No. 1, p. 206 (Jun. 1965).
Cho-Therm Thermal Interface Products Brochure.
Chomerics Advertisement, "Do Your Thermal Interface Materials Need Positive Reinforcement?", Feb. 1987.
Chomerics Technical Bulletin, #66, Oct. 1987.

*Primary Examiner*—James J. Bell
*Attorney, Agent, or Firm*—John Dana Hubbard; William L. Baker

[57] ABSTRACT

A form stable thermally conductive urethane material comprising of a urethane resin, a urethane curing agent and one or more thermally conductive fillers. It is useful in transferring thermal energy, for example, from an electonic component to a heat sink. The thermally conductive urethane material eliminates the problems of migration and adherence of conformal coatings associated with other thermally conductive materials. The thermal conductive urethane material may be formed with or without a support layer of glass cloth, plastic mesh or film or metal mesh or foil. If desired, the thermally conductive material may be electrically insulative.

11 Claims, No Drawings

THERMALLY CONDUCTIVE MATERIALS

This invention relates to a cured, form stable material for use in removing or transferring thermal energy. More particularly, this invention relates to a novel urethane thermally conductive material for use in dissipating thermal energy, especially in electronic devices.

BACKGROUND OF THE INVENTION

Most electronic components, such as transistors and diodes, generate large amounts of thermal energy, heat, during use. This heat must be removed from the area of the electronic device as it is well known that a buildup of heat adversely effects the performance characteristics of electronic components.

The use of a heat sink is one method of removing heat from such components. The heat sink draws the heat away from the device via conduction and dissipates the heat by convection, radiation or both. However, the interface between the heat sink and the device is not perfectly smooth. Irregularities in the heat sink and/or device surface, even on a microscopic scale, form pockets in which air can become entrapped. These pockets reduce the efficiency of the thermal transfer in that there is less surface contact between the heat sink and component through which heat can be conducted. Further, it is well known that air is a poor thermal conductor, therefore the presence of air pockets drastically reduces the rate of thermal transfer between the heat sink and device. To counter this problem, it is known to use a layer of thermally conductive material between the heat sink and device to fill in the surface irregularities and eliminate air pockets.

Perhaps the best known and widely used material is a semi-liquid silicone grease. The grease is generally filled with a thermally conductive filler, such as aluminum oxide, to enhance its conductive properties.

Alternatively, filled waxes have been suggested as a conductive material. See U.S. Pat. No. 4,299,715.

Both the greases and waxes are messy to form and use, are generally in a flowable state at the operating temperature of the device, and are subject to migration. The migration of these materials is difficult, if not impossible, to control and the greases and waxes contaminate contacts, switches and leads making them difficult to solder and in some cases causing them to cease functioning.

Containment of the silicone grease and the wax have been suggested, but the success of such efforts has been minimal. See U.S. Pat. Nos. 3,391,242 and 4,466,483.

Another approach used to increase the heat transfer between the heat sink and electronic device is to use a filled silicone rubber sheetlike material instead of the silicone grease or wax. The silicone rubber in general is sufficiently soft to conform to the surface irregularities existing on the two interfacing surfaces of the heat sink and the device. The addition of a thermally conductive filler enhances the silicone's thermal transfer abilities to a level comparable to that of the greases and waxes.

The silicone rubber materials have been an improvement over the greases and waxes in that they tend to be easier to use and apply. The silicone rubber materials however have several drawbacks which make them less than ideal candidates. Silicone rubbers exhibit the same migration problem as the greases and waxes. The rubbers tend to spread and flow when subjected to pressure and/or heat. This tendency causes the rubber to flow to areas where its presence is not desired, often resulting in contaminated switches and leads which are either rendered unsolderable or inoperable or both. Additionally, silicone rubbers resist coating by other materials. This tendency is particularly troublesome in the electronic industry where conformal coatings are widely used. The term "conformal coatings" as used herein is defined as thin layers of protective materials which are applied to circuit boards and other electronic components to prevent oxidation, water or dust damage, or contamination.

The present invention provides a novel thermally conductive material which is resistant to migration and contamination and is able to accept conformal coatings.

SUMMARY OF THE INVENTION

In accordance with the present invention, a thermally conductive material is provided which is easy to apply and use, is able to accept conformal coatings and is resistant to migration or creep. The present invention is a urethane based thermally conductive material useful for transferring thermal energy from one place to another with minimal thermal impedance. Moreover, the present invention is a material of a urethane binder filled with thermally conductive materials, such as boron nitride or magnesium oxide. The filled binder is useful by itself or in conjunction with a reinforcing substrate for dissipating heat from an electronic component or device.

It is the object of the present invention to provide a novel material for conducting thermal energy.

It is an additional object of the present invention to provide a formstable, thermally conductive, electrically insulative material for conducting thermal energy from a heat source to a heat sink.

It is another object to provide a thermally conductive material which is easier to use and cleaner to apply than presently known materials.

A further object is to provide a thermally conductive material which may be applied in a liquid or solid form.

An object of the present invention is to provide an uncured urethane resin filled with a thermally conductive filler and a urethane resin curing agent, apply the urethane resin to a desired surface and cure the resin to form a solid, thermally conductive material.

A further object of the present invention is to provide a formstable, laminated heat conducting structure having a center reinforcement layer with two outer layers formed of an urethane binder filled with a thermally conductive filler such as zinc oxide, aluminum oxide, aluminum nitride, magnesium oxide or boron nitride.

Another object is to provide a thermally conductive, electrically insulative material containing a center reinforcement layer of glass fiber, plastic film or metal foil and two or more outer layers of a cured urethane binder containing one or more thermally conductive fillers selected from zinc oxide, magnesium oxide, aluminum oxide, aluminum nitride or boron nitride.

DETAILED DESCRIPTION OF THE INVENTION

A preferred embodiment of the present invention comprises a form stable, sheetlike thermally conductive material formed of a urethane binder, a curing agent and one or more thermally conductive fillers. A support layer may also be included.

The thermally conductive material should be self supporting and form stable, even at elevated temperatures of up to 300° F. By form stable it is meant that the material, even at an elevated temperature, will retain its shape and will not migrate or "creep".

The urethane binder of the present invention may be any urethane system which is capable of being cured into a form stable material, which does not foam during curing and which is capable of holding large amounts of filler while remaining form stable.

Preferably, the urethane binder is a polyurethane resin which is capable of being crosslinked or cured at elevated temperatures. More preferably, it is based on a polyester having diisocyanate end groups. An example of a suitable polyurethane resin suitable as a binder in the present invention is Durane 9814, an aromatic isocyanate terminated polyester sold by Ruffy & Swanson. The polyurethane as supplied has its end groups blocked so as to be unreactive. Upon heating to about 160° C. for two minutes the isocyanate becomes unblocked and ready to react with a suitable curing system. Also useful is DURANE 8051 which is similar to the 9814 discussed above.

Alternatively, one could form the urethane binder in situ by mixing a polyester or polyether component with an isocyanate component, a curing system and selected fillers and curing the mixture to form a thermally conductive material. A suitable polyester/polyether is DESMOPHE® 1100, sold by Naftone, Inc. A suitable isocyanate component is MONDUR S®, a stabilized isocyanate adduct in a 60% MEK (methyl ethyl ketone) solution.

Regardless of the particular urethane binder selected, it should be capable of forming a form stable material, preferably, the binder should be resilient or elastomeric upon curing so that it can conform to the surfaces to and from which the thermal energy is transferred.

Any commercially available curing agent may be used in the present invention so long as it does not result in a foamed or brittle, nonconformable material. Suitable and well known curing agents include secondary, tertiary and polyamines. Generally, one may use the curing agent recommended by the supplier of the urethane used in the invention. Preferably, the curing agent should be heat activated.

A preferred curing agent useful in the present invention is a mixed amine/epoxy system. The preferred system comprises an amine curing agent, preferably a polyamine, and an epoxy resin. The ratio of amine to epoxy (based upon weight of final product) can be varied over a wide range from about 0.05:1 to about 1:1. The most preferred ratio of amine to epoxy in the curing agent is about 0.125:1. An example of a suitable amine useful in the mixed curing agent is ARALDITE 956® consisting of 90% modified aliphatic polyamine with 10% of a tertiary amine. An example of a suitable epoxy resin is EPI-REZ®510.

The amount of curing agent added to the urethane is conventional and well known and can be varied upon the urethane, filler, rate of cure and temperature of cure selected. One should follow the amounts suggested by the supplier of the urethane. However, as a general guideline, it is preferred to add from about 4 to about 12% by weight of finished product of curing agent. More preferably from about 6 to 7 percent, by weight of finished weight, curing agent yields a useful cured urethane product.

Fillers suitable for use in the present invention are particulate solids capable of providing the urethane binder with the desired thermal conductivity. Preferably, these fillers are particulate solids which are electrically insulative as well as thermally conductive.

Examples of such particles include but are not limited to aluminum oxide, aluminum nitride, boron nitride, magnesium oxide and zinc oxide. If the material does not need to be electrically insulative, the fillers may include various thermally conductive metals such as silver, gold and copper or metal coated materials, such as silver coated glass, silver coated copper or silver coated aluminum.

The particles should be of a sufficiently small size so as to not distort the surface of the thermally conductive material. Preferably the filler will be of a size from about 1 micron to about 50 microns, more preferably in a range of from abut 5 microns to about 25 microns, most preferably about 10 microns.

The fillers are to be included in the urethane binder in an amount sufficient to provide the desired thermoconductivity. Preferably, the fillers are included in amount of from about 10% by weight to about 85% by weight of the finished product. More preferably, the fillers are included in amounts ranging from about 40% by weight to about 75% by weight and most preferably about 68% by weight.

The more preferred fillers are boron nitride, magnesium oxide and aluminum oxide with boron nitride being the most preferred filler.

A flame retardant may be added to reduce the risk of burning or the generation of noxious fumes in the event of an electrical fire. Any of the well known flame retardants useful in plastics, in particular, urethanes, are useful in this invention. Preferred flame retardants include pentoxide and decabromodiphenyloxide.

The amount of flame retardant can be varied over a wide range depending upon the selected retardant and urethane binder, and the desired degree of flame retardation. The amount should be sufficient to reduce the ignition point of the urethane binder to an acceptable level for the product's end use. The amount, however, should not be sufficient as to interfere with the thermal or electrical conductivity of the material. Preferably, the flame retardant should be added in amounts from about 1% to 14% by weight of the urethane binder. More preferably, it should be added in amounts of from about 4 to 10% by weight of the urethane binder and most preferably, about 8% by weight of the urethane binder.

Additional ingredient may also be added so long as they do not interfere with the conformability or thermal conductivity of the product. For example, it is preferred to use a solvent, such as toluene or MEK, when compounding the urethane so as to make the mixing and application easier. If desired, one may also add a pigment to the urethane.

As the thermally conductive urethane material of the present invention is form stable, it may be used by itself as a thermal transfer device without the incorporation of a support layer.

If desired, one may incorporate one or more layers of a support material to increase the thermally conductive urethane material's toughness, resistance to elongation and tearing, and other mistreatment. The incorporation of support materials is particularly desired where the problems of cut-through or over-torqued fasteners may occur. Cut-through is caused by burrs or sharp metal protrusions on one or both of the surfaces to be thermally connected. These burrs or protrusions are believed to cut or tear the thermally conductive material and provide a pathway through which an electrical short may occur. Similarly, over-torquing of the fastening devices is believed to subject the thermally conductive material to abnormally strong tensions which may also cause tearing and electrical shorts. Additionally, any tearing or penetration of the thermally conductive material allows for the formation of a pocket of air, which as described above, is a poor thermal conductor. These air pockets can lead to localized hot spots and an overall decline in thermal performance.

The support material should not interfere with the thermal conductivity of the thermally conductive urethane material. Preferably, the support material is itself thermally conductive. In applications where electrical insulation between the components is important, the selected support material should be dielectric.

Examples of reinforcing materials useful in the present invention include, but are not limited to glass fiber mesh or cloth, plastic mesh or films and metal mesh or foils.

The glass fiber cloth maybe woven or unwoven.

The plastic support material may be a mesh material, or a film. If a film, it may be solid or foraminous. Examples of suitable plastics include nylons, polyesters, polyamides, polyimides, polyethylenes, or PEEK. Well known plastic films particularly useful in the present invention are MYLAR ® polyester films and KAPTON ® polyimide films. As plastic films generally exhibit poor thermal conductivity properties, it is desirable to use a film which contains a thermally conductive filler. One such filled film is KAPTON MT ®, a polyimide film which contains either an aluminum oxide or boron nitride filler. This material exhibits twice the thermal conductivity of an equivalent unfilled film.

Where electrical insulation is not a requirement, metal mesh or foil is the preferred support material due to their high thermal conductivity. Examples of preferred metals useful as a mesh or a foil, include but are not limited to, aluminum, copper, silver, iron and tinned copper.

Regardless of the support material used, it should be as thin as practicable while still providing the desired support.

The support materials may be embedded in the thermally conductive urethane material or coated, calendered or attached to one surface of the thermally conductive urethane material. Preferably, the support material and thermally conductive urethane material are formed into a laminate of three or more layers with the support layer being the center layer and the thermally conductive urethane material forming the outer layers.

The heat conductive material of the present invention may be formed in many ways.

One method of forming the material is to combine the uncured urethane resin with the selected filler or fillers and curing agent and thoroughly mix the ingredients while slowly adding a solvent, such as toluene or MEK, until a liquid having a smooth texture is achieved. The material is then cast onto a release sheet such as glass, Mylar ® film or coated paper, and heated to drive off the solvent and cure the urethane resin.

An alternative method is to thoroughly mix the ingredients together with a sufficient amount of solvent to obtain a thin liquid. The liquid can then be sprayed or coated onto a surface such as a release sheet or a reinforcing material such as a glass fiber cloth, a Kapton ® film or metal foil and heated to cure. Additionally, the same liquid formulation may have a porous material, such as a glass fiber mesh, dipped into it to form the desired coating.

Another method of forming the heat conductive material of the present invention is by molding. This is particularly useful when one wishes to form a substantially thick heat conductive layer or when one wishes to form a specifically shaped heat conductive material. In molding the heat conductive material, the uncured components are mixed with a solvent and poured into a prefabricated mold which is open on one side to allow for evaporation of the solvent. If desired, one may coat the inside of the mold with a release coating before adding the uncured components. The mold is then heated or otherwise subjected to an external energy field to completely cure the urethane binder. Instead of using a separate mold, it may be desired to use a mold which allows the heat conductive material to be molded in place directly to one of the surfaces it will contact.

A preferred method is to form a laminated material of three or more layers in which the center layer is formed of a film material discussed above, such as glass mesh, KAPTON ® film or metal foil and an outer layer of the thermally conductive urethane material is coated and cured on each side of the film to form a cohesive laminated material. The coating may occur sequentially so that one side of the reinforcing material is coated and cured and then the process is repeated on the opposite side. Preferably, the coating is applied to both sides simultaneously and then cured.

The thermally conductive urethane product may be formed into sheets and then cut to the desired shape or molded in the desired shape at the outset, either in a mold or directly in place, as described above.

The resultant thermally conductive urethane material should be sufficiently soft so as to conform to the surfaces with which it interfaces. Preferably, the material should have a Shore A hardness of less than 100, more preferably, a Shore A hardness of about 70.

The properties exhibited by a typical product prepared in accordance with the present invention are as follows:

Thickness—2 to 20 mils ±1 mil, preferably about 5—8

Volume Resistivity—$1 \times 10^{14}$ ohm—cm (ASTM D-257)

Dielectic Strength—6000 Volts minimum (ASTMD-149)

Hardness, Shore A—70 to 100 (ASTM D-2240)

Thermal Impedence—0.09° to 0.40° C./W (Chomerics #27)

Thermal Conductivity—$1.2 \times 10^{-3}$ to $1.6 \times 10^{-3}$ CAL/°cm sec. (Chomerics #28)

The following examples are illustrative of the material encompassed by the present invention. These examples are only illustrative and not meant to limit in any way the true scope and spirit of the present invention.

All measurements for thermal impedance and thermal conductivity were respectively obtained by Chomerics Test Procedure #27 and Chomerics Test Procedure #28. A description of the Chomerics Test Procedure #27 is contained in an article entitled, "A Test Device for Measuring Thermal Impedance of Heat Transfer Interface Materials," by M. DeSorgo, published in Power Conversion and Intelligent Motion Magazine, September 1985. A description of the Chomerics Test Procedure #28 is contained in article entitled "Determination of Thermal Conductivity of Heat Transfer Interface Materials," by M. DeSorgo and T. Ouellette, published in Power Conversion and Intelligent Motion Magazine, August 1985.

EXAMPLE I

A heat conductive material envisioned by the present invention was formed as follows:

75 grams of an urethane resin, DURANE 9814, was thoroughly mixed with 1.5 grams of an amine curing agent, 12.0 grams of an epoxy resin, EPI-REZ 510, ® 7.5 grams of decabromodiphenyloxide, 71 grams of toluene and 45 grams of boron nitride until it reached a smooth texture. The material was cast on to a release sheet at a thickness of about 5 mils, cured at a temperature of 275° F. for seven minutes. The release sheet was removed and the resultant product had a thermal impedance of 0.09° C.-in$^2$/Watt and a thermal conductivity of $1.6 \times 10^{-3}$/Cal-cm/sec-cm$^2$-° C.

EXAMPLE II

The procedure and ingredients of Example I were repeated except that the mixture was coated onto both side of a Kapton MT filled polyimide sheet (1 mil thickness) to form a product 5 mils thick. The resultant product had a thermal impedance of 0.25° C.-in$^2$/watt and a thermal conductivity of $1.5 \times 10^{-3}$ Cal-cm/sec-cm$^2$-° C.

EXAMPLE III 94 grams of DURANE 9814 urethane was thoroughly mixed with 1.8 grams of an amine curing agent, 15 grams of EPI-REZ 510 epoxy resin, 9.4 grams of decabromodiphenyloxide, 140 grams of magnesium oxide, and 55 grams of toluene until it formed a smooth liquid. The mixture was coated in a 2 mil thick layer onto both sides of a MYLAR ® film and cured to form a 5 mil thick thermally conductive pad. The pad had a thermal impedence of 0.4° C.-in$^2$/watt and a thermal conductivity of $1.4 \times 10^3$ Cal-cm/sec-cm$^2$-° C.

EXAMPLE IV

The ingredients and procedure of Example III was repeated except that the reinforcing material was an unfilled KAPTON ® film The product had a thermal impedance of 0.4° C.-in$^2$/watt and a thermal conductivity of $1.4 \times 10^{-3}$ Cal-cm/sec-cm2-° C.

As can be seen from the examples above, a form stable, thermally conductive urethane material may be formed with or without a reinforcing layer. In addition to providing thermal conductivity, the material also does not creep or migrate thereby eliminating contamination of electrical leads. Further, the material allows one to apply a conformal coating which will adhere to the urethane material.

While this invention has been described with reference to its preferred embodiment in the electronics industry, other embodiments of the present invention can be used in other industries where the need for a form stable, thermally conductive material is desired or required.

Furthermore, while this invention has been described with reference to its preferred embodiments, other embodiments can achieve the same result. Variations and modifications of the present invention will be obvious to those skilled in the art and it is intended to cover in the appended claims all such modifications and equivalents as fall within the true spirit and scope of this invention.

What I claim is:

1. A thermally conductive laminate consisting essentially of a center support layer and a pair of outer layers on opposite sides of the center support layer; the center support layer being a material selected from the group consisting of glass fiber, plastic film and metal foil; the outer layers being formed of a cured, form stable urethane binder and one or more thermally conductive fillers.

2. A thermally conductive, electrically insulative laminate of claim 1 wherein the one or more thermally conductive fillers are selected from the group consisting of aluminum oxide, aluminum nitride, boron nitride, magnesium oxide and zinc oxide.

3. A thermally conductive, electrically insulative laminate of claim 1 wherein the urethane binder is a urethane resin, amine curing agent and epoxy resin.

4. A thermally conductive, electrically insulative material formed by a process comprising the steps of
    (a) forming a urethane binder of urethane resin, amine curing agent, epoxy resin and a solvent,
    (b) adding one or more thermally conductive fillers to the urethane binder and thoroughly mixing,
    (c) casting the urethane binder and one or more fillers onto a film surface, and
    (d) heating the cast binder and one or more fillers to drive off the solvent and effect curing of the urethane binder.

5. A thermally conductive, electrically insulative material formed by the steps of claim 4 further comprising the steps of
    (e) casting an additional layer of binder and one or more fillers to an opposite surface of the film and
    (f) heating the cast binder and one or more fillers to drive off the solvent and effect curing of the urethane binder.

6. A thermally conductive, electrically insulative material formed by the process of claim 4 wherein the one or more conductive fillers are selected from the group consisting of aluminum oxide, aluminum nitride, boron nitride, magnesium oxide and zinc oxide.

7. A thermally conductive, electrically insulative material formed by the process of claim 5 wherein the film is cast and cured on both sides with the urethane binder and one or more thermally conductive fillers simultaneously.

8. A thermally conductive laminate consisting essentially of at least three layers; a first outer layer, a center support layer and a second outer layer; the first and second outer layers being formed on opposite sides of the center support layer so as to encase the center support layer and wherein the first and second outer layers are formed of a form stable polyurethane containing one or more thermally conductive fillers.

9. The thermally conductive laminate of claim 8 wherein the form stable polyurethane of the first and second outer layers is formed from a urethane resin, a mixed amine/epoxy curing agent and one or more thermally conductive fillers.

10. The thermally conductive laminate of claim 9 wherein the urethane resin is an aromatic isocyanate terminated polyurethane prepolymer, the mixed amine/epoxy curing agent is formed from a polyamine and an epoxy resin, wherein the ratio of amine to epoxy is from about 0.05:1 to about 1:1, and the thermally conductive fillers are selected from the group consisting of aluminum oxide, aluminum nitride, boron nitride, magnesium oxide and zinc oxide.

11. A thermally conductive laminate consisting essentially of:

(a) a center support layer selected from the group consisting of glass fiber, plastic films and metal meshes or foils;
(b) a first form stable, thermally conductive layer applied to a first outer surface of the center support layer; and
(c) a second, form stable, thermally conductive layer applied a second outer surface of the center support layer on a side opposite the first outer surface of the center layer; and
(d) wherein the first and second form stable thermally conductive layers comprise a polyurethane binder containing one or more thermally conductive fillers.

* * * * *